United States Patent
Yoshino

(10) Patent No.: US 7,875,146 B2
(45) Date of Patent: Jan. 25, 2011

(54) METHOD OF PRODUCING HARMONICS GENERATING DEVICE

(75) Inventor: Takashi Yoshino, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/395,908

(22) Filed: Mar. 2, 2009

(65) Prior Publication Data

US 2009/0229740 A1   Sep. 17, 2009

(30) Foreign Application Priority Data

Mar. 14, 2008   (JP)   ............... 2008-065715

(51) Int. Cl.
*B32B 37/14*   (2006.01)
*G02B 6/10*   (2006.01)

(52) U.S. Cl. ............ 156/257; 156/268; 156/322; 156/330; 382/132; 372/22

(58) Field of Classification Search ........ 156/264, 156/257, 268, 322, 330; 385/132; 372/22
See application file for complete search history.

(56) References Cited

U.S. PATENT DOCUMENTS

| 5,759,619 | A * | 6/1998 | Jin ................ 427/163.2 |
| 6,181,462 | B1 | 1/2001 | Yoshino et al. |
| 6,516,127 | B1 | 2/2003 | Fluck et al. |
| 6,640,032 | B2 * | 10/2003 | Kondo et al. ........... 385/51 |
| 7,548,678 | B2 * | 6/2009 | Sugita et al. .......... 385/129 |
| 2007/0189689 | A1 | 8/2007 | Yamaguchi et al. |

FOREIGN PATENT DOCUMENTS

| JP | 2000-047277 A1 | 2/2000 |
| JP | 2002-501630 A1 | 1/2002 |
| JP | 2006-330661 A1 | 12/2006 |
| JP | 2008-209451 A1 | 9/2008 |
| JP | 2009-217133 A1 | 9/2009 |
| WO | 2006/041172 A1 | 4/2006 |

OTHER PUBLICATIONS

U.S. Appl. No. 12/855,770, filed Aug. 13, 2010, Takashi Yoshino.

* cited by examiner

*Primary Examiner*—Linda L Gray
(74) *Attorney, Agent, or Firm*—Burr & Brown

(57) ABSTRACT

It is provided a chip having a supporting substrate, a wavelength conversion layer, a base adhesive layer made of an organic resin, an upper-side substrate provided on an upper surface side of the wavelength conversion layer, and an upper-side adhesive layer made of an organic resin for adhering the wavelength conversion layer to the upper-side substrate. The wavelength conversion layer has an optical waveguide with a periodic domain inversion structure provided therein. The chip is heat treated. Anti-reflection films are formed on an incident side end face and projection side end face of the optical waveguide, respectively.

3 Claims, 5 Drawing Sheets

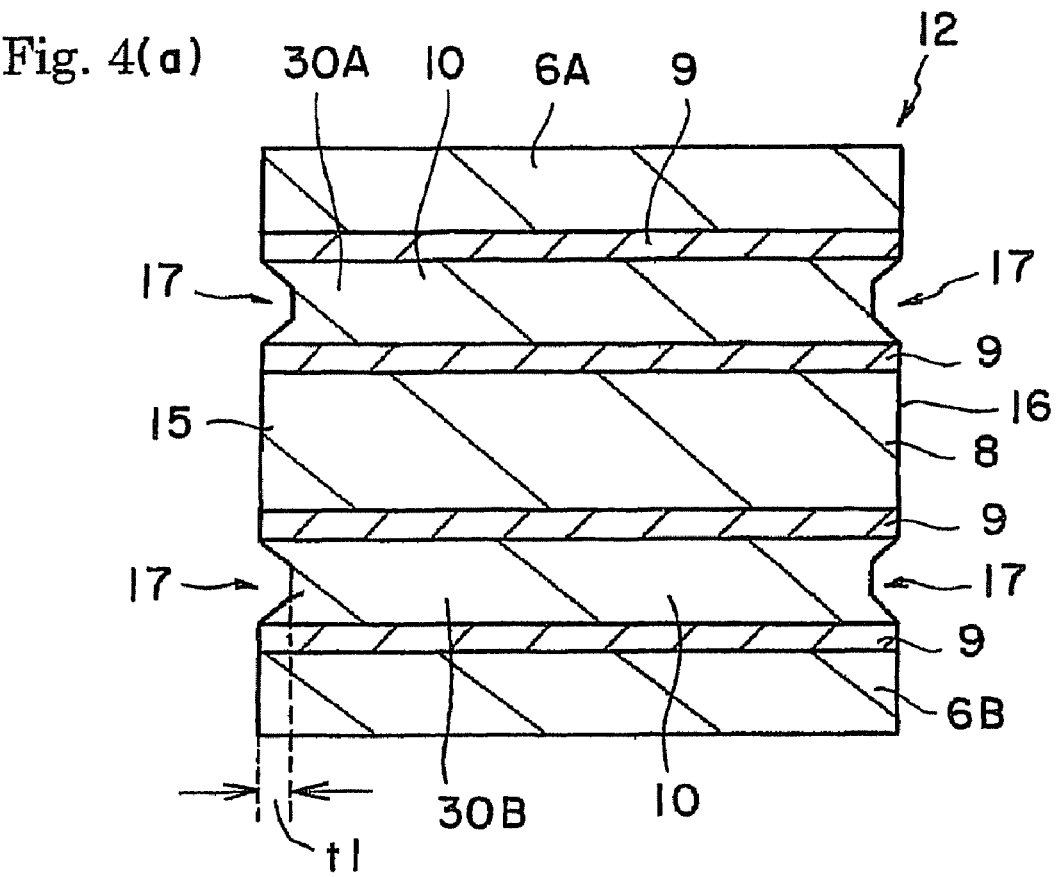
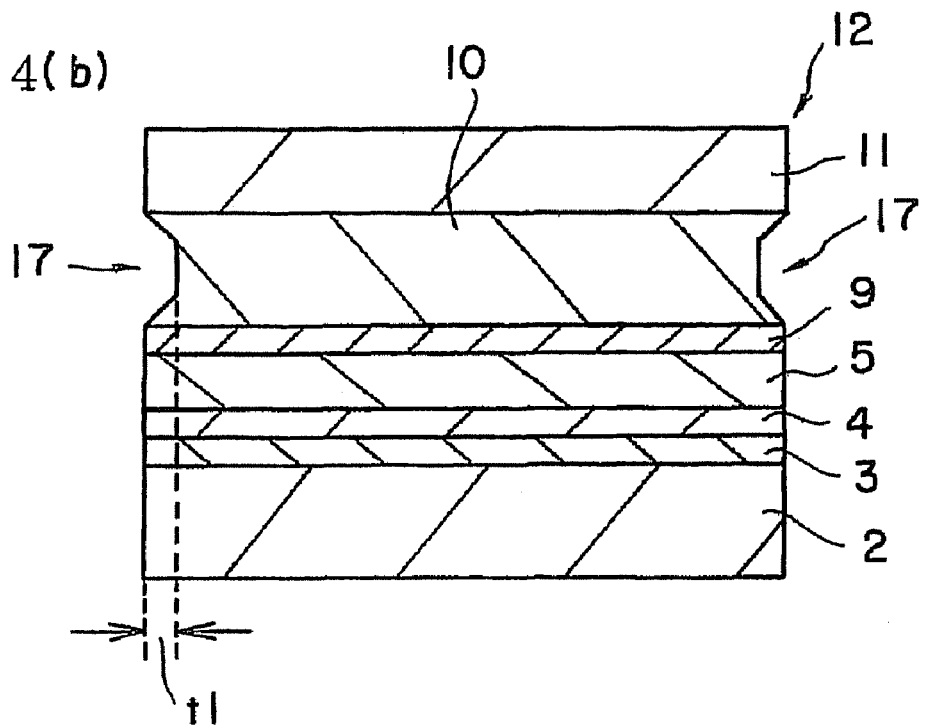

US 7,875,146 B2

METHOD OF PRODUCING HARMONICS GENERATING DEVICE

This application claims the benefit of Japanese Patent Application P2008-65715 filed on Mar. 14, 2008, the entirety of which is incorporated by reference.

FIELD OF THE INVENTION

The present invention relates to a harmonics generating device of a quasi phase matching system.

BACKGROUND OF THE INVENTION

Nonlinear optical crystal such as lithium niobate or lithium tantalate single crystal has a high secondary nonlinear optical constant. When a periodic domain inversion structure is formed in the above crystals, a second-harmonic-generation (SHG) device of a quasi-phase-matched (QPM) system can be realized. Further, when a waveguide is formed within this periodic domain inversion structure, the high-efficiency SHG device can be realized and further, applied to optical communication, medical science, photochemistry, various optical measurements over a wide range.

In a harmonics generating device disclosed in United States Patent No. 2007-0189689A, the periodic domain inversion structure is formed within a channel type optical waveguide, whereby a fundamental wave incident on the optical waveguide is subjected to wavelength conversion into higher harmonics. In a harmonics generating device disclosed in WO 2006/41172 A1, a thin plate of a ferroelectric single crystal is adhered to a supporting substrate and thereon, an upper-side substrate is adhered through a buffer layer and an adhesive layer, thereby forming the channel type optical waveguide within the thin plate. Further, the periodic domain inversion structure is formed within the optical waveguide, whereby a fundamental wave incident into the optical waveguide is subjected to wavelength conversion into higher harmonics.

SUMMARY OF THE INVENTION

In such a harmonics generating device, when an antireflection film is formed on an incident side end face and a projection side end face of a channel type optical waveguide, return light to a laser oscillator oscillating a fundamental wave must be prevented.

However, the present inventors have found that in actually manufacturing a device, when the antireflection film is formed on the end face, a resin of a ridge groove part adjacent to an optical waveguide is recessed from the end face, cracks are generated in the antireflection film, and the antireflection film is peeled off from the end face. Further, when the device is manufactured and optical axes are aligned to an external optical fiber, laser light is caused to be incident on the device to measure the amount of light. At this time, the resin adhesive layer may burn in the vicinity of the end face of the device and an adhesive failure sometimes occurs in the vicinity of the end face. The above phenomenon is characteristic to a structure in which a waveguide conversion layer including the optical waveguide having formed therein the periodic domain inversion structure is interposed between the upper and lower substrates by an organic resin adhesive.

An object of the present invention is, in a harmonics generating device having a wavelength conversion layer including the optical waveguide with a periodic domain inversion structure provided between upper and lower substrates with an organic resin adhesive, to prevent peelings or cracks of the antireflection film on the end face of the device and combustive destruction of the adhesive layer in the vicinity of the end face of the device.

The present invention provides a method of manufacturing a harmonics generating device, the method comprising the steps of:

providing a chip comprising:
a supporting substrate,
a wavelength conversion layer comprising an optical waveguide with a periodic domain inversion structure provided therein,
a base adhesive layer comprising an organic resin for adhering a lower surface of the wavelength conversion layer and the supporting substrate,
an upper-side substrate formed on an upper surface side of the wavelength conversion layer, and
an upper-side adhesive layer comprising an organic resin for adhering the wavelength conversion layer and the upper-side substrate;
heat-treating the chip; and
forming anti-reflection films on an incident side end face and projection side end face of the optical waveguide, respectively.

The inventors have examined the cause of the cracks or peelings of the above-described antireflection film and the cause of the combustive destruction of the organic resin adhesive. As a result, the inventors have found that minute concave portions are generated in the organic resin adhesive constituting the upper-side adhesive layer formed over the optical waveguide. A size of the concave portion is merely on the order of 100 to 200 nm. However, the inventors have found that the cracks or peelings of the antireflection film are caused by the above-described minute deformation.

Based on this finding, the inventors considered that after manufacturing the chip and before forming the antireflection film, a heat treatment is applied to the process. As a result, in a previous step for forming the antireflection film, a small recess was caused to be generated on the upper-side adhesive layer from the end face. The inventors have found that when the antireflection film is then formed, the cracks or peelings of the film are prevented to thereby form a preferable film. Moreover, the inventors have found that light hardly shines on the organic resin adhesive at the alignment of optical axes and combustive destruction in the organic resin adhesive in the vicinity of the end face can be prevented. The present invention has been thus accomplished.

BRIEF DESCRIPTION OF THE DRAWINGS

FIG. 4(a) is a cross-sectional view showing the chip 12 before forming the antireflection film, and corresponds to a cross-sectional view taken along the line IVa-IVa of FIG. 3.

FIG. 4(b) is a cross-sectional view showing the chip 12 before forming the antireflection film, and corresponds to a cross-sectional view taken along the line IVb-IVb of FIG. 3.

DETAILED DESCRIPTION OF THE INVENTION

Figure 1:
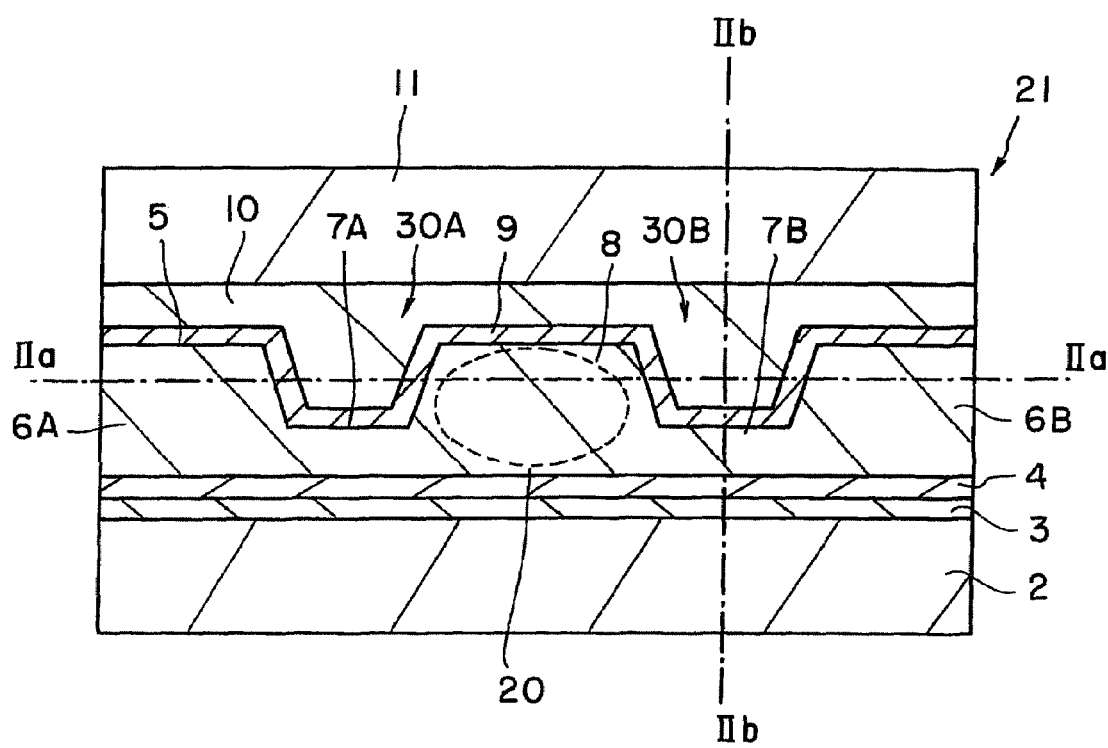
FIG. 1 is a perspective view schematically showing a chip 21 before forming an antireflection film.
Figure 2A:
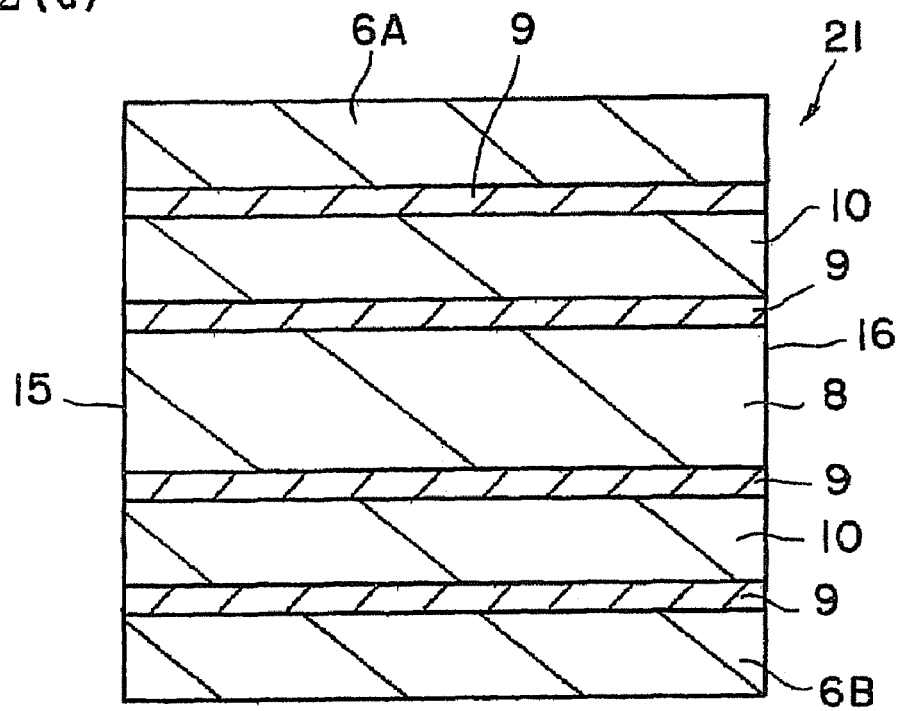
FIG. 2(a) is a cross-sectional view taken along the line IIa-IIa of FIG. 1.
Figure 2B:
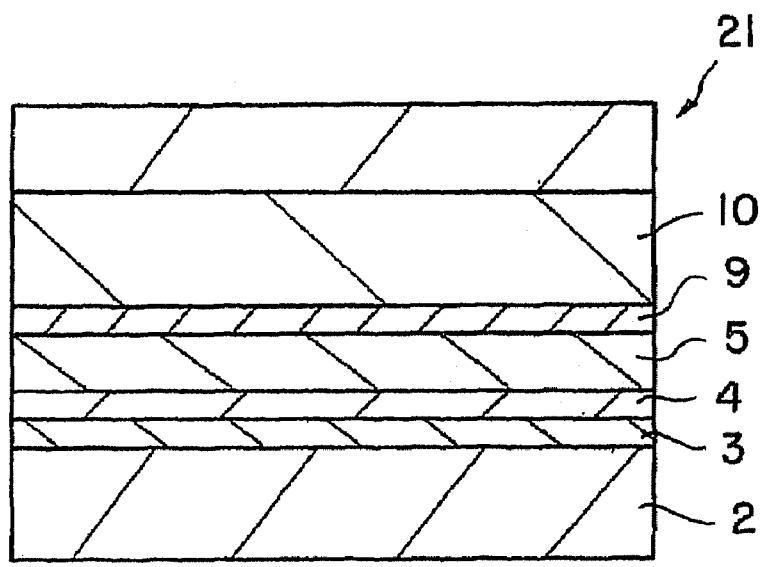
FIG. 2(b) is a cross-sectional view taken along the line IIb-IIb of FIG. 1.

FIG. 1 is a perspective view schematically showing a chip 21 before forming an antireflection film as a reference example. FIG. 2(a) is a cross-sectional view taken along the line IIa-IIa of FIG. 1, and FIG. 2(b) is a cross-sectional view taken along the line IIb-IIb of FIG. 1.

As shown in FIG. 1, a pair of elongated grooves 7A and 7B is provided in a wavelength conversion layer 5 including, for example, an X plate (a Y plate, an offset X plate, or an offset Y plate) composed of ferroelectric single crystal. The grooves 7A and 7B are arranged in parallel with each other and a ridge part 8 is formed by these grooves. A channel type optical waveguide 20 is formed by the ridge part 8 and the grooves 7A and 7B. On the outside of the grooves 7A and 7B, extension parts 6A and 6B are formed, and the parts form a thin plate.

In the case of X plate (Y plate), a horizontal direction is a Z direction and the ferroelectric single crystal is polarized in the Z direction in FIG. 1. The X axis (Y axis) is vertical to an upper surface of the wavelength conversion layer 5. In the case of offset X plate and Y plate, the X axis (Y axis) is inclined from a surface perpendicular to the main surface of the wavelength conversion layer 5. This inclination angle is, for example, 10 degrees or less. In addition, a Z plate can also be used.

Within the channel type optical waveguide 20, the polarization is made to the Z direction perpendicular to a traveling direction of light and the polarization direction is periodically inverted. As a result, a fundamental wave incident from an incident face 15 of the optical waveguide 20 is subjected to a wavelength conversion within the optical waveguide 20 and higher harmonics project from a projection surface 16.

An underclad 4 is formed on a lower surface side of the wavelength conversion layer 5 and an overclad 9 is formed on an upper surface side of the layer 5. The lower surface of the wavelength conversion layer 5 is adhered to a supporting substrate 2 through the underclad 4 and a base adhesive layer 3. The upper surface of the layer 5 is adhered to an upper-side substrate 11 through the overclad 9 and an upper-side adhesive layer 10. The base adhesive layer 3 is formed along an almost flat lower surface. The upper-side adhesive layer 10 is filled also in the ridge grooves 7A and 7B, and forms groove filling parts 30A and 30B.

When the antireflection film is formed on the above-described chip 21, cracks or peelings of the antireflection film occur on the end faces 15 and 16 of the optical waveguide 20, and combustive destruction in an organic resin adhesive is generated at the alignment of optical axes. As a result, viewing the adhesive from the end faces 15 and 16, it is found that minute concave portions are formed on the organic resin adhesive constituting the upper-side adhesive layer 10. A size of these concave portions is on the order of 100 to 200 nm. On the other hand, before forming the antireflection film, the concave portions are hardly formed and a size thereof is on the order of 20 nm. That is, as shown in FIGS. 2(a) and (b), the end faces are almost flat.

Accordingly, it is considered that when forming the antireflection film, the organic resin forming the upper-side adhesive layer 10 causes minute shrinkage and thereby minute concave portions occur on the end faces to thereby cause the peelings or cracks of the antireflection film. Further, it is considered that since the upper-side adhesive layer are hardly concaved from the end faces in the chip, the organic resin is apt to absorb laser light and get heated, which causes the combustive destruction at the alignment of the optical axes.

Figure 3:
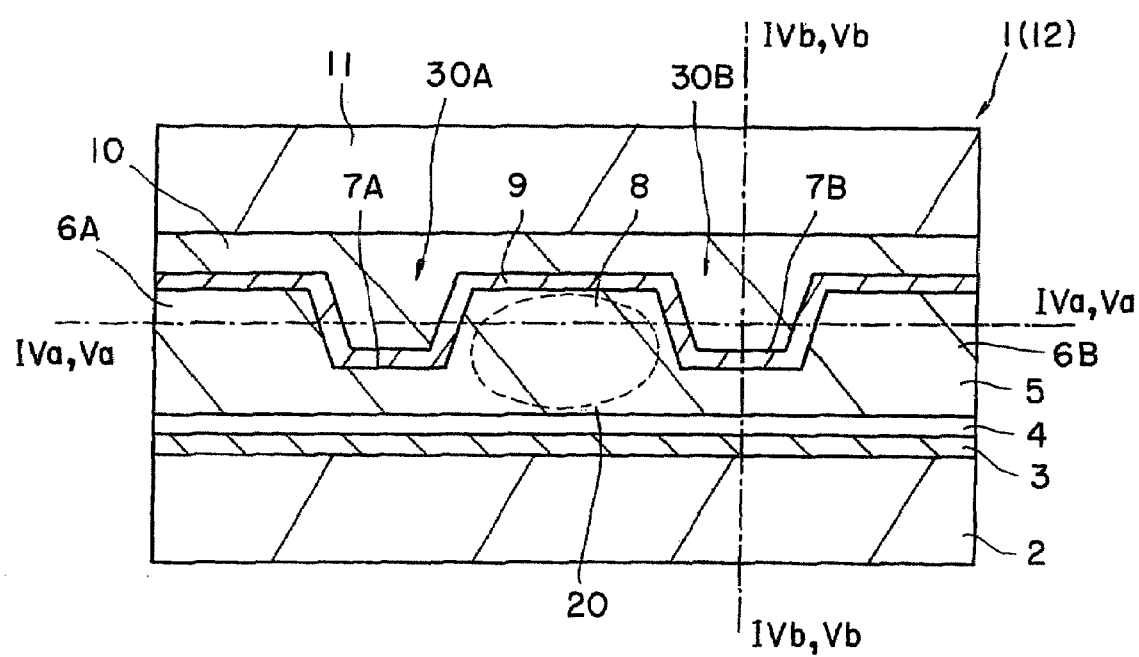
FIG. 3 is a cross-sectional view showing the chip 12 and device 1 after forming the antireflection film according to an embodiment of the present invention.

FIG. 3 is a cross-sectional view showing the chip 12 and device 1 after forming the antireflection film according to an embodiment of the present invention. FIG. 4(a) is a cross-sectional view showing the chip 12 before forming the antireflection film, and corresponds to a cross-sectional view taken along the line Va-Va of FIG. 3. FIG. 4(b) is a cross-sectional view showing the chip 12 before forming the antireflection film, and corresponds to a cross-sectional view taken along the line Vb-Vb of FIG. 3. FIG. 5(a) is a cross-sectional view showing the device 1 after forming the antireflection film, and corresponds to a cross-sectional view taken along the line IVa-IVa of FIG. 3. FIG. 5(b) is a cross-sectional view showing the device 1 after forming the antireflection film, and corresponds to a cross-sectional view taken along the line IVb-IVb of FIG. 3.

According to the present invention, the chip 21 (refer to FIGS. 1 and 2) before forming the antireflection film is obtained, and then is heat-treated. Thereby, as in the chip 12 shown in FIGS. 4(a) and 4(b), the upper-side adhesive layer 10 is recessed inwardly from the incident side end face 15 and the projection side end face 16 to thereby cause concave portions 17. After this heat treatment, the antireflection film 20 is formed over the entire surface of the incident side end face and the projection side end face, thereby obtaining the device 1 shown in FIGS. 5(a) and 5(b).

The channel type optical waveguide formed in a wavelength conversion layer is not limited, and may include a ridge type optical waveguide, a diffusion optical waveguide or the like. The diffusion optical waveguide can be formed by a metal diffusion process (e.g., titanium diffusion process) or proton exchange. A processing method for forming a ridge structure is not limited, and machining, ion milling, dry etching, laser ablation or the like can be used.

The ferroelectric single crystal for forming the wavelength conversion layer is not limited, and lithium niobate, lithium tantalate, a solid solution of lithium niobate-lithium tantalate, $K_3Li_2Nb_5O_{15}$ or $La_3Ga_5SiO_{14}$ can be exemplified.

Although specific examples of the organic resin adhesive for adhering the waveguide conversion layer to the supporting substrate and the upper-side substrate is not particularly limited, it may be epoxy resin adhesive, acrylic resin adhesive, a thermosetting resin adhesive, a ultraviolet curable resin adhesive, or "Alon ceramics" (trade name: Supplied by Toa Gosei Co. Ltd.,) having a thermal expansion coefficient (thermal expansion coefficient of $13 \times 10^{-6}$/K) relatively close to that of a material having an electro-optic effect, such as lithium niobate.

On this occasion, a sheet of an organic resin adhesive may be interposed between the wavelength conversion layer and the supporting substrate as well as the wavelength conversion layer and the upper-side substrate to join them. Preferably, a sheet formed of a thermosetting, photocuring or photothickening resin adhesive is interposed between the wavelength conversion layer 5 and the supporting body 2 as well as the wavelength conversion layer 5 and the upper-side substrate 11, and the sheet is then cured. For such a sheet, a resin film is appropriate.

Further, from the viewpoint of the present invention, a thickness of the upper-side adhesive layer is preferably from 0.5 to 3.0 μm.

Specific examples of the material of the supporting substrate and the upper-side substrate are not particularly limited. Lithium niobate, lithium tantalate, a glass such as quartz glass, quartz, Si or the like can be exemplified. In this case, from the viewpoint of difference of thermal expansion coefficient, the materials of the wavelength conversion layer, the supporting substrate, and the upper-side substrate may preferably be the same and most preferably be lithium niobate single crystal. A thickness of the upper-side substrate and that of the supporting substrate are not particularly limited, but may preferably be 100 μm or more from the above viewpoint. Further, although the upper limit of the thickness of the supporting substrate and that of the upper-side substrate is not particularly defined, it is preferably 2 mm or less from a practical view.

A temperature of heat-treating the chip is not particularly limited when being set in the range such that shrinkage of the organic resin can be suppressed at formation of the antireflection film. However, from the viewpoint of the working effect of the present invention, the heat treatment temperature is preferably 150° C. or higher and more preferably 190° C. or higher. When the heat treatment temperature is extremely high, there is a possibility that a harmful influence is exerted on the ferroelectric materials or materials of the organic resin. Therefore, the temperature is preferably 300° C. or lower and more preferably 230° C. or lower.

A time of heat-treating the chip is not particularly limited, as long as the shrinkage of the organic resin adhesive can be suppressed at the formation of the antireflection film. However, from the viewpoint of the working effect of the present invention, the time is preferably 30 minutes or more. Further, from the viewpoint that a harmful influence is prevented from being exerted on the ferroelectric materials or materials of the organic resin, the time is preferably 3 hours or less.

The amount t1 of recess (refer to FIG. 4) from the end face of the upper-side adhesive layer in the chip 12 after the heat treatment is measured by an AFM. From the viewpoint of the present invention, the amount t1 of recess is preferably 100 nm or more. Further, when the amount t1 of recess is extremely large, the output of the higher harmonics is reduced. Therefore, in view of the foregoing, the amount of recess is preferably 1500 nm or less, and more preferably 1000 nm or less.

Further, the amount t2 of recess after forming the antireflection film is not particularly limited. However, from the viewpoint that cracks or peelings of the antireflection film are suppressed, the difference (t2−t1) is preferably 100 nm or less, and more preferably 50 nm or less.

Further, the end face may be polished after heat-treating the chip, so that the amount t1 of recess can be reduced. The end face of the chip may be polished, flattened, and then heat-treated. After the heat treatment, when the polishing is not performed, the amount of recess t1 is apt to increase. Accordingly, the heat treatment and the end face polishing process are combined to obtain the appropriate amount t1 of recess.

The materials of the antireflection film are not particularly limited, but $SiO_2$, $Ta_2O_5$, and MgF are preferred.

Further, the antireflection film can be formed by a vacuum deposition method and an ion beam sputtering method.

EXAMPLES

Example 1

Figure 5:
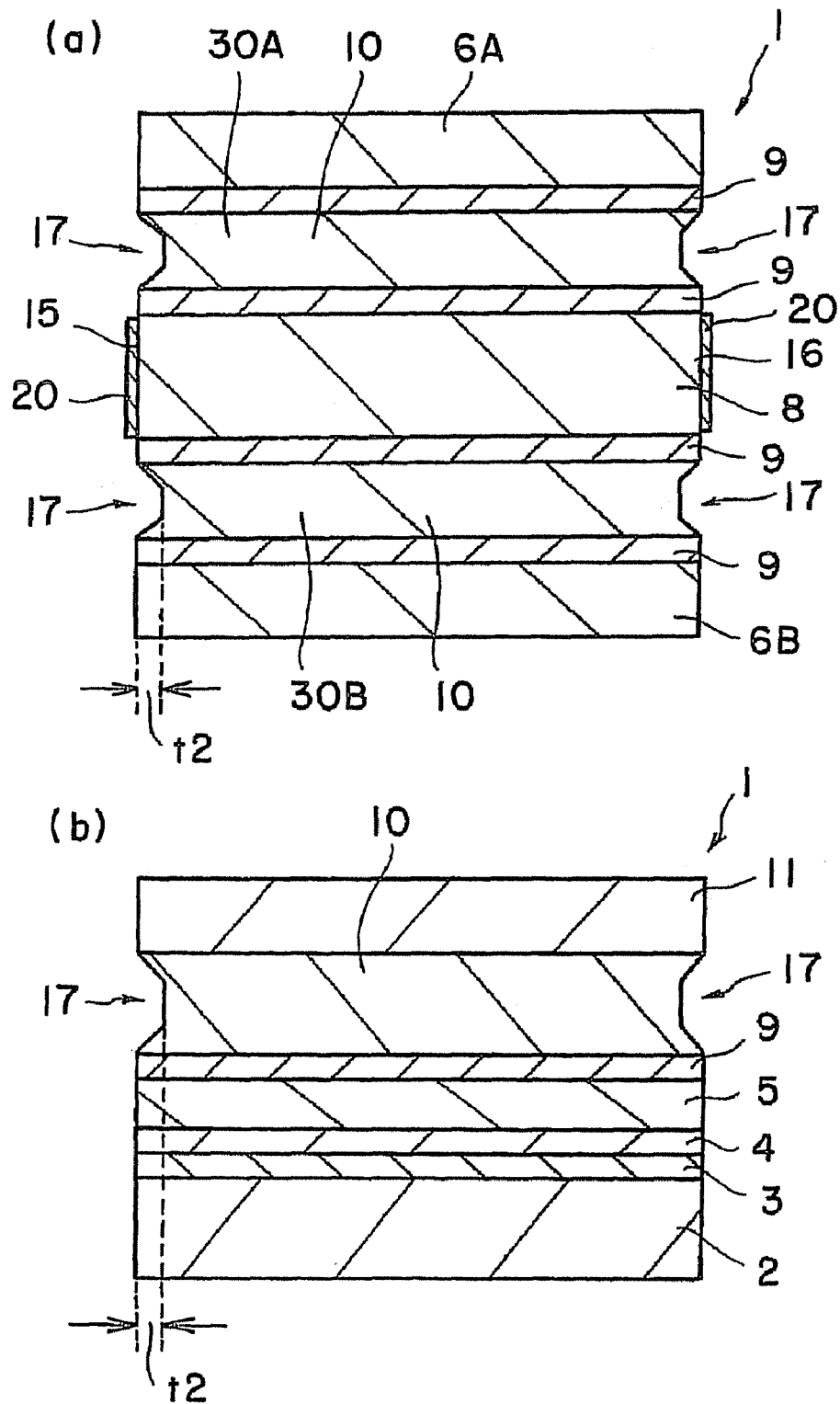
FIG. 5(a) is a cross-sectional view showing the device 1 after forming the antireflection film, and corresponds to a cross-sectional view taken along the line Va-Va of FIG. 3.
FIG. 5(b) is a cross-sectional view showing the device 1 after forming the antireflection film, and corresponds to a cross-sectional view taken along the line Vb-Vb of FIG. 3.

According to the method illustrated with reference to FIGS. 3 to 5, the device 1 was manufactured.

Specifically, a comb-shaped periodic electrode with a period of 6.6 μm was formed on an MgO 5% doped lithium niobate-5 degree off-cut Y substrate of 0.5 mm thick, by photolithographic method. A pulse voltage was applied to form a periodic domain inversion structure. After forming the periodic domain inversion structure, an $SiO_2$ underclad 4 of 0.4 μm thick was formed by sputtering.

The adhesive 3 was applied to a non-doped lithium niobate substrate of 0.5 mm thick, to which the above-described MgO doped lithium niobate substrate was stuck. The surface of the MgO doped lithium niobate substrate was abraded and polished until the thickness thereof reached 3.7 μm. Next, the ridge part 8 was formed by the laser abrasion method. After forming the optical waveguide, an $SiO_2$ overclad 9 of 0.5 μm thick was formed by the sputtering method. The adhesive 10 was applied to the overclad 9, to which the upper-side substrate 11 composed of a non-doped lithium niobate single crystal of 0.5 mm thick was stuck.

The device 1 was cut into a length of 9 mm and a width of 1.0 mm by a dicer to obtain the chip 21 (refer to FIG. 2). The amount of recess at that moment was measured and as a result, was 20 nm. This chip 21 was heat-treated at 190° C. for one hour and subsequently, the end face of the device was polished. The amount t1 of recess of the adhesive layer from the end face was measured by AFM and as a result, was 115 nm.

Next, the antireflection film was formed on the end face of the optical waveguide. The antireflection film was formed using a multilayer film made of $SiO_2$ and $Ta_2O_5$ as materials, by the sputtering method. Thereafter, the amount t2 of recess of the adhesive layer from the end face was measured and as a result, was 118 nm.

The optical characteristics of this optical waveguide were measured by using a Yb doped fiber laser. The oscillation output from the laser was adjusted to 100 mW, and the fundamental light was condensed on the end face of the waveguide by a lens; as a result, the output of 80 mW was coupled to the waveguide. When the phase matching was performed by adjusting the temperature of the optical waveguide, the SHG output of 13 mW at the maximum was obtained. The wavelength of the fundamental light at that moment was 1062.5 nm.

Example 2

The chip 21 (refer to FIG. 2) was manufactured in the same manner as in the Example 1. Next, the end face of the chip was polished and thereafter, heat-treated at 210° C. for one hour. The amount t1 of recess of the adhesive layer from the end face was measured and as a result, was 900 nm. The antireflection film was formed on the end face of the optical waveguide in the same manner as in the Example 1. Then, the amount t2 of recess of the adhesive layer from the end face was measured and as a result, was 910 nm.

The optical characteristics of this optical waveguide were measured by using a Yb doped fiber laser. The oscillation output from the laser was adjusted to 100 mW, and the fundamental light was condensed on the end face of the waveguide by a lens; as a result, the output of 80 mW was coupled to the waveguide. When the phase matching was performed by adjusting the temperature of the optical waveguide, the SHG output of 12 mW at the maximum was obtained. The wavelength of the fundamental light at that moment was 1062.4 nm.

Comparative Example 1

The chip 21 (refer to FIG. 2) was manufactured in the same manner as in the Example 1. Then, the amount t1 of recess of the adhesive layer from the end face was measured by AFM and as a result, was 20 nm. Subsequently, the antireflection film was formed on the end face of the optical waveguide in the same manner as in the Example 1. Then, the amount t2 of recess of the adhesive layer from the end face was measured and as a result, was 200 nm.

The optical characteristics of this optical waveguide were measured by using a Yb doped fiber laser. The oscillation output from the laser was adjusted to 100 mW, and the fundamental light was condensed on the end face of the waveguide by a lens; as a result, the combustive destruction of the end face occurred. Further, the antireflection film was peeled off from the end face of the chip.

Comparative Example 2

The chip 21 (refer to FIG. 2) was manufactured in the same manner as in the Example 1. Then, the amount t1 of recess of the adhesive layer from the end face was measured by AFM and as a result, was 20 nm. Subsequently, the chip was end-face-polished and then dipped in acetone solution for one hour. Thereafter, the amount t1 of recess of the adhesive layer from the end face was measured by the AFM and as a result, was 1700 nm.

Subsequently, the antireflection film was formed on the end face of the optical waveguide in the same manner as in the Example 1. At this time, cracks occur on the end face of the waveguide. The amount t2 of recess of the adhesive layer from the end face was measured and as a result, was 2200 nm.

The optical characteristics of this optical waveguide were measured by using a Yb doped fiber laser. The oscillation output from the laser was adjusted to 100 mW, and the fundamental light was condensed on the end face of the waveguide by a lens; as a result, the output of 40 mW was coupled to the waveguide. When the phase matching was performed by adjusting the temperature of the optical waveguide and as a result, the SHG output of 3 mW at the maximum was obtained. The wavelength of the fundamental light at that moment was 1062.5 nm.

The invention claimed is:

1. A method of producing a harmonics generating device, the method comprising the steps of:
   providing a chip comprising:
      a supporting substrate,
      a wavelength conversion layer comprising an optical waveguide with a periodic domain inversion structure provided therein,
      a base adhesive layer comprising an organic resin for adhering a lower surface of the wavelength conversion layer to the supporting substrate,
      an upper-side substrate provided on an upper surface side of the wavelength conversion layer, and
      an upper-side adhesive layer comprising an organic resin for adhering the wavelength conversion layer and the upper-side substrate;
   heat-treating the chip; and
   then forming anti-reflection films on an incident side end face and projection side end face of the optical waveguide, respectively.

2. The method of claim 1, wherein:
   the optical waveguide comprises a ridge type optical waveguide;
   a ridge groove is formed on each side of the ridge type optical waveguide; and
   each ridge groove is filled with the upper-side adhesive layer.

3. The method of claim 2, wherein after the heat-treating step and before the film forming step, an amount of recess of the upper-side adhesive layer from an end face of the chip is from 100 nm to 1500 nm within the ridge groove.

* * * * *